May 2, 1961
E. NICOLINI
2,982,195
FILM DEVELOPING TANK
Filed Nov. 3, 1958
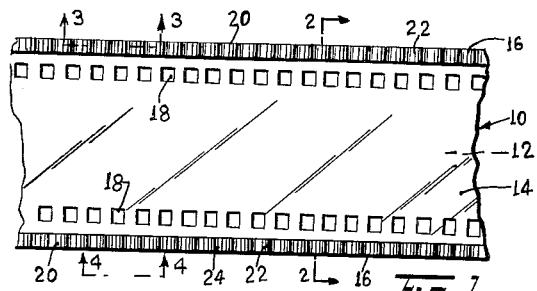
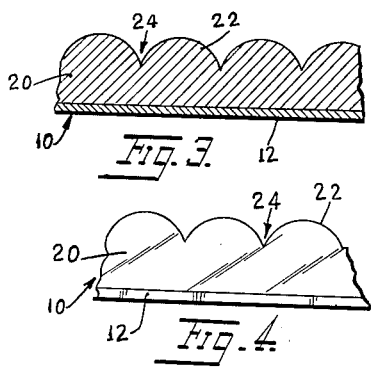
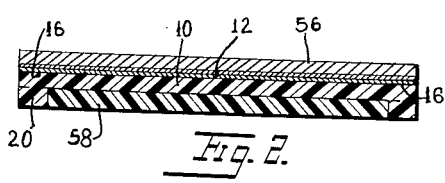
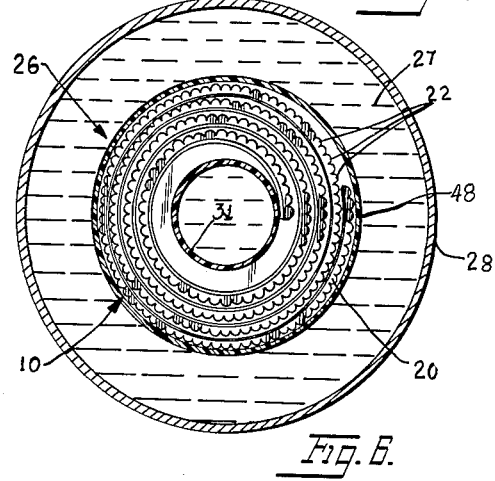
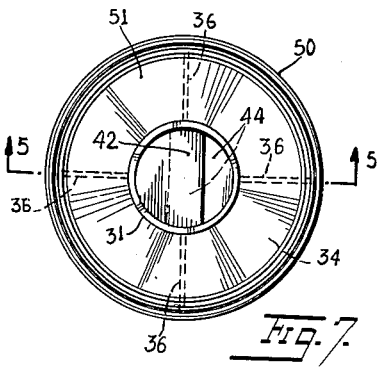
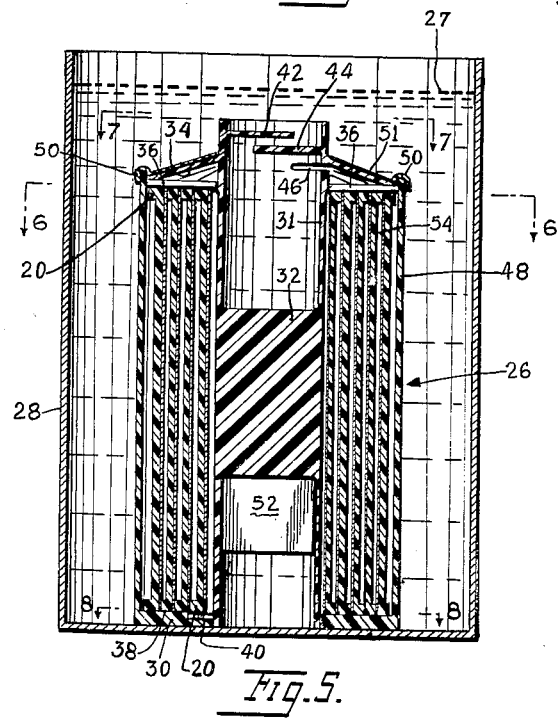
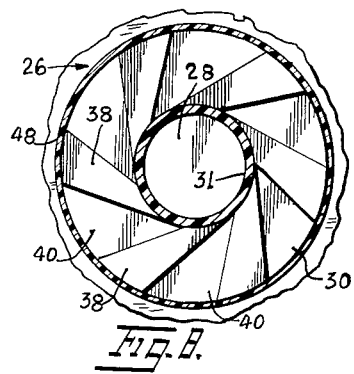
INVENTOR.
EMIL NICOLINI
BY
*ATTORNEY*

2,982,195
FILM DEVELOPING TANK

Emil Nicolini, 862 E. 215th St., New York, N.Y.

Filed Nov. 3, 1958, Ser. No. 771,590

2 Claims. (Cl. 95—90.5)

This invention relates to coiled photographic films and more particularly to the treatment of coiled photographic film strips in liquid baths.

A principal object of the present invention is to provide a coiled photographic film strip having means for spacing the superposed coils of the film strip so that liquid may pass therebetween when the film strip is in coiled condition, in a liquid bath.

Another object of the invention is to provide a photographic film strip with corrugated protuberances along its long edges on one surface thereof so that upon coiling of the film strip, the superposed coils are held in spaced relation and liquid can penetrate therebetween.

A further object of the invention is to provide a motion picture film strip with corrugated protuberances along its long margins on one surface thereof closely spaced from the sprocket perforations thereof whereby the perforations assist in maintaining a free circulation of fluid to all parts of the film.

It is also an object of the invention to provide an improved reel for supporting a roll of photographic film in spiral formation for immersion in a fluid.

The invention further comprehends the provisions of a filler strip removably fitted on the face of the photographic film strip between the margin protuberbances after fluid treatment to facilitate printing of the photograph.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of a portion of a motion picture film embodying the invention.

Fig. 2 is an enlarged cross-sectional view taken on the plane of the line 2—2 of Fig. 1, showing a filler strip in position for printing on paper.

Fig. 3 is a sectional view on an enlarged scale taken on the plane of the line 3—3 of Fig. 1.

Fig. 4 is a view looking along the line 4—4 of Fig. 1 in the direction of the arrows on an enlarged scale.

Fig. 5 is an enlarged vertical sectional view taken on the plane of the line 5—5 of Fig. 7, showing the film in coiled formation in a film holder in a tank.

Fig. 6 is a cross-sectional view taken on the plane of the line 6—6 of Fig. 5.

Fig. 7 is a view looking along the line 7—7 of Fig. 5 in the direction of the arrows.

Fig. 8 is a cross-sectional view taken on the plane of the line 8—8 of Fig. 5.

Referring in detail to the drawings, a portion of a photographic film 10 embodying the invention is shown in Fig. 1. This is a portion of a standard motion picture film having a plastic body with a coating on one face of a photosensitive photographic emulsion 12. The picture portions of the film are indicated at 14 and the marginal portions are shown at 16. In such marginal portions, there are the usual perforations 18.

When such a film is developed, fixed, washed or subjected to similar treatment with fluids, it is rolled up in such a way as to leave a space between the different layers or windings of the roll and is subjected to the action of the fluid, for example, a developing, fixing or washing solution, with which the film is to be treated. It is highly desirable to ensure the spacing of the layers or windings so that the fluid will contact all parts of the film.

According to the invention, the film 10 is formed along each margin 16 with a continuous protuberance 20, projecting from one face of the film, the protuberance being formed of the same material as the body of the film and being substantially rectangular in cross section. The outer face of the protuberance is formed with semi-cylindrical corrugations 22 leaving cusp-like grooves 24 therebetween. The protuberance in the case of a motion picture film is located outwardly of the sprocket perforations 18. The height of the protuberances is of the order of 5% of the thickness of the film. The protuberances may thus be, for example, approximately 1/2000 of an inch in height above the general level of the film.

In Fig. 5, the improved film 10 is shown in coiled formation in a film holder 26 immersed in a solution of photographic emulsion solution 27 in a tank 28. The tank has a removable lid not shown. The holder 26 comprises a plastic spool having an upstanding hollow hub 31 provided with a solid formation 32 at its center midway its ends in order to reinforce the same. The film 10 is coiled around the hub 31. A slanting roof 34 extends radially from the hub adjacent its top and is supported by radial arms 36 extending from the hub below the roof. The upper surface of the base is formed with hills 38 and dales 40 arranged tangentially with respect to the hub 31, the coils of the film resting upon the hills 38. A pair of oppositely disposed semicircular baffle plates 42 and 44 extend inwardly from the inner surface of the hub just above the roof 34, and a slot 46 is formed in the wall of the hub below the baffle plates and underneath the roof. A shell 48 is integral with the periphery of an annular base as best shown in Fig. 5. The top edge of the shell 48 is engaged in the beaded periphery of an annular base 30 as best shown in Fig. 5. The top edge of the shell 48 is engaged in the beaded periphery 50 of a plastic cover 51 fitted over the roof. The shell, base and cover constitute the housing of the film holder 26. A plate 52 depends from the solid formation 32 diametrally across hub 31 and is adopted to be engaged by a tool for turning the spool in the shell.

The spool including hub 31 and roof 34 is removably disposed in the shell concentric therewith, as shown in Figs. 5–8. To mount the coil of film 10 on the spool, cover 51 and the spool are removed from the shell. The spool is inverted and the coil of film is then placed axially on the hub 31. Shell 48 is then inverted and placed over the loaded spool. The free end of the hub is fitted inside base 30 and flush therewith. The shell is then reinverted and cover 51 is replaced. The assembled film holder 26 can then be placed in the tank in the position shown in Figs. 5–8.

As will be seen from Figs. 5 and 6, the protuberances 20 serve as spacing devices whereby the separate coils of the roll of film are kept at a certain distance from one another so that between the coils spaces 54 are created thereby facilitating the free access of the fluid 27 to the film 10. The film arranged in this manner can be subjected to treatment with the fluids without requiring the use of cumbrous vessels and without tiresome manipulations. The fluid 27 enters the top of the hub 31, moves over the baffle plates 42 and 44 into the hub and out through the slot 46 to the top of the coil of film and thence downwardly through the grooves 24 in the corrugated sides of the protuberances 20 to the dales or recesses 40 on the top surface of the base 30. A circuitous path is thus provided for the fluid by the baffle plates and slot. The fluid 27 will readily flow into the spaces 54 to develop the film without requiring the film to be unrolled and unspooled as is required with conventional film. This simplifies the development of the film as it would only be necessary to immerse the holder 26 into a developing fluid, and it is not necessary to develop the film enclosed in the holder in total darkness. This can be accomplished in an open ended container. Scratches and imperfections in the developed film normally caused by handling during development are avoided and a more perfectly developed film results.

Upon termination of the treatment of the film, in order to print the film on printing paper 56 such as shown in Fig. 2, it is desirable that a transparent plastic filler strip 58 be fitted on the face of the film opposite the emulsion coated face thereof. This filler strip ensures that an even flat surface will be presented to contact the light ray producing device.

If desired, the film can be developed on the spool without the use of the holder 26, or the film can be developed in a coiled condition in the holder 26 without the use of the spool. In each instance, the protuberances 20 will space the adjacent turns of the coiled film to ensure proper treatment in the development bath. The sprocket perforations 18 assist in circulating the developing fluid around the film.

The protuberances 20 will normally be formed during the molding process by which the film is fabricated, and such protuberances do not interfere with the normal use of the film in the camera during exposure.

The invention is of wide applicability in this art and while I have illustrated and described the embodiment of it as applied to a standard form of motion picture film, it will be understood that the invention is not limited to use in such films.

Having thus described my invention, what I claim as new, and desire to secure by United States Letters Patent is:

1. A film holder comprising a base, an upright hollow hub in the center of the base open at both ends, a slanting roof radiating from the hub adjacent its top, said hub having a slot therein underneath the roof, a coiled film supported on the base around the hub, an outer shell disposed around the film between the peripheries of the base and roof, said base having alternately arranged hills and dales on its top surface, said hills serving as supports for the film, and spaced baffle plates in the hub adjacent the top thereof above said slot.

2. A film holder comprising a base, an upright hub in the center of the base, open at both ends, a slanting roof radiating from the hub adjacent its top, a coiled film supported on the base around the hub, an outer shell disposed around the film between the peripheries of the base and roof, said hub having a slot therein underneath the roof, said base having alternately arranged hills and dales in its top surface, said hills serving as supports for the film, spaced baffle plates in the hub adjacent the top thereof above said slot, a solid mass in the center of the hub, and a plate depending from said mass and extending across the center thereof for receiving a turning tool.

References Cited in the file of this patent
UNITED STATES PATENTS

| | | |
|---|---|---|
| 778,906 | Shaw | Jan. 3, 1905 |
| 1,140,500 | Corey | May 25, 1915 |
| 1,205,367 | MacBride | Nov. 21, 1916 |
| 1,659,909 | De Forest | Feb. 21, 1928 |
| 2,212,357 | Vanckrwalker | Aug. 20, 1940 |
| 2,771,015 | Hall | Nov. 20, 1956 |